Dec. 8, 1970   A. L. MUNSON   3,546,662

PLUG FOR WIRING OF DIFFERENT VOLTAGE LEVELS

Filed Sept. 23, 1968

INVENTOR
ARDEN L. MUNSON
BY Robert Meyer
ATTORNEY

United States Patent Office 3,546,662
Patented Dec. 8, 1970

1

3,546,662
PLUG FOR WIRING OF DIFFERENT
VOLTAGE LEVELS
Arden L. Munson, Logansport, Ind., assignor to P. L.
Mallory & Co. Inc., Indianapolis, Ind., a corporation
of Delaware
Filed Sept. 23, 1968, Ser. No. 761,483
Int. Cl. H01r 33/72
U.S. Cl. 339—192                                13 Claims

ABSTRACT OF THE DISCLOSURE

A plug connecting an electro-mechanical device to a junction box. The plug has means to receive male terminals from the electro-mechanical device and electrical wiring so as to electrically connect the wiring to the male terminals, means to receive groups of wiring, means to direct one of the groups of wiring to the means to receive the male terminals, and means to direct another of the groups of wiring in a predetermined direction.

---

A manufacturer of an electro-mechanical device for commercial use requiring approval of the Underwriter's Laboratory is limited in the way that electrical connections to the device may be made in the field. For example, the Underwriters' Laboratory require that high voltage (greater than 30 volts) connections may not be "made up" in the same enclosure with low voltage connections. Therefore, in the case of primary controls such as is used in fuel burning systems, where the control is switching power circuits and also thermostat (low voltage) circuits, this has caused some rather elaborate mechanical fastening means to be used. In particular, a control must mechanically be secured to the wire junction box with a hinge or the control must contain its own junction box.

In the case of the hinge approach, a control is supported by a mechanical member while all of the power wiring is done. Then the control is thrown into position over the junction box making sure that all wires are tucked into the box without pinching any of the wire's insulation. Finally, the thermostat wires are secured to terminals on top of the control. This approach has for the most part been unwieldy.

In the case of a control with an internal junction box, the control is mounted and then various high and low voltage wires are brought to the control terminals with the control maintaining high and low voltage spacing by divided compartments within the control enclosure. This too becomes very unwieldy when being assembled in the field.

In either case, it is necessary to individually replace all the wires to the control when the control is changed for any reason.

The present invention is concerned with a plug used to connect an electro-mechanical device to a junction box wherein high and low voltage wiring is required in the operation of the device, and has as one of its objects a provision of such a plug which electrically insulates the wiring fed to the plug from each other.

Another object of the invention is the provision of such a plug that allows the electro-mechanical device and the wiring for the device to be easily connected to a junction box.

Another object of the invention is the provision of a plug for receiving electrical wiring having means for receiving male terminals of the electro-mechanical device.

Yet another object of the invention is the provision of a plug for receiving wiring wherein the means for receiving the male electrical terminals also include means to

2 receive electrical wiring so as to provide an electrical connection between the wiring and the male terminals.

Another object of the invention is the provision of a plug for receiving wiring wherein the means for receiving the male terminals and the wiring include jacks held within individual hollow cylinders, electrically insulated from each other.

Still another object of the invention is the provision of a plug for receiving wiring having means for receiving groups of wiring and means to direct one of the groups to the means for receiving the male terminals and electrical wiring.

Another object of the invention is the provision of a plug for receiving wiring wherein the means for receiving and directing the groups of wiring includes screw terminals disposed in individual compartments, having openings to direct the wiring.

Another object of the invention is the provision of a plug for receiving wiring having means to direct another group of wiring connected to the screw terminals in a predetermined direction.

Still another object of the invention is to provide a combination of an electro-mechanical device requiring high and low voltage inputs and a plug attached to the device, the plug having means to receive cooperating high and low voltage male terminals extending from the device and means to separate the high and low voltage wiring being fed to the plug.

Another object of the invention is the provision of the combination of an electro-mechanical device and a plug which separates the high and low voltage wiring required by the device and a junction box for receiving such wire, the device and the junction box being connected to the plug on opposite faces of the plug.

These and other objects of the invention will become apparent from the following description taken in conjunction with the accompanying drawings wherein like numerals describe elements of a similar function.

Generally speaking, the objects of the invention are accomplished by providing a plug for receiving electrical wiring, the plug including an electrically insulating base portion, means extending through said base portion for receiving individual male electrical terminals electrically insulated from each other and electrical wiring so as to electrically connect the wiring to the terminals, means for receiving electrical terminals to which groups of wiring can be connected and for directing one of the groups to the receiving means for male terminals and wiring, and means to direct another of the groups of wiring in a predetermined direction away from the terminals.

The invention, in another of its aspects relates to the combination of an electro-mechanical device requiring high and low voltage inputs and a plug attached to said electro-mechanical device, the plug being adapted to receive low voltage wiring through electrical terminal means carried by the plug, and to direct the low voltage wiring to means receiving and electrically insulating from each other both high and low voltage wiring, the means further receiving male terminals extending from the electro-mechanical device.

While the invention will be described with reference to the use of a plug in combination with an electro-mechanical device receiving low and high voltage wiring, it should be understood that the invention need not be so limited and that the plug can readily be used in conjunction with a device requiring any type of wiring.

Figure 1:
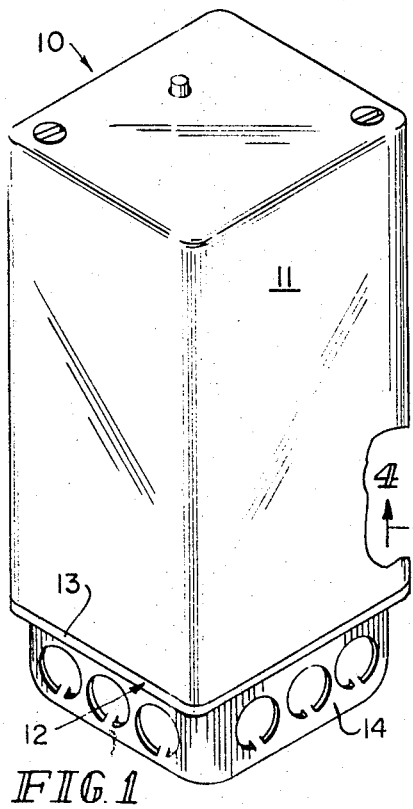
FIG. 1 is a perspective view of an electro-mechanical device, a junction box for the wiring of the device and the plug to which they are attached.

Referring now to the drawings, there is shown in FIG. 1 an electro-mechanical device 10 which is suitably attached to a plug 12, and a junction box 14 which is also suitably attached to the plug. Both the electro-mechanical device and the junction box may be attached to the plug through suitable means such as bolts.

Electro-mechanical device 10 which may be enclosed in a suitable enclosure or casing 11 may include a variety of devices, such as, for example, the control system for fuel burning apparatus such as is used in furnaces. Such a control system would include timing mechanisms, transformers, and so forth which would require a high voltage input (above 30 volts) and elements such as a thermostat circuit which would require low voltage inputs. Junction box 14 may include any type of such box normally used in the art for housing the electrical wiring needed for the control system.

Figure 2:
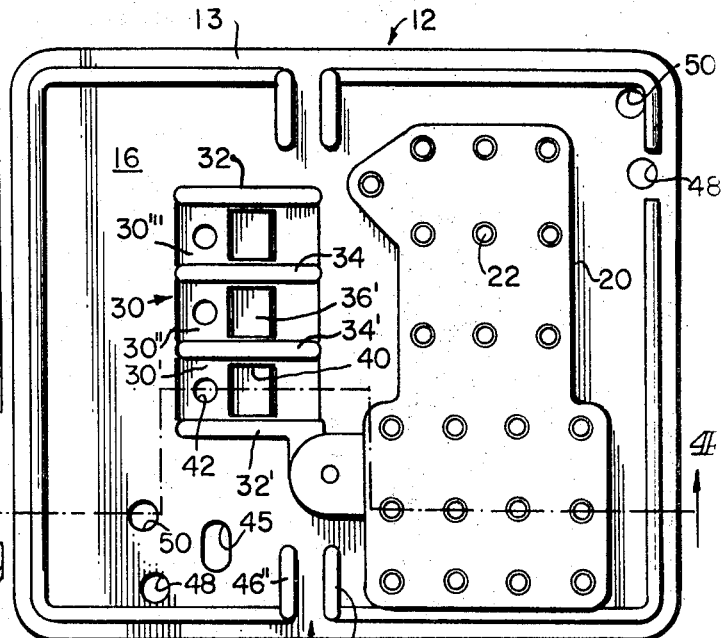
FIG. 2 is a top view of the plug.
Figure 3:
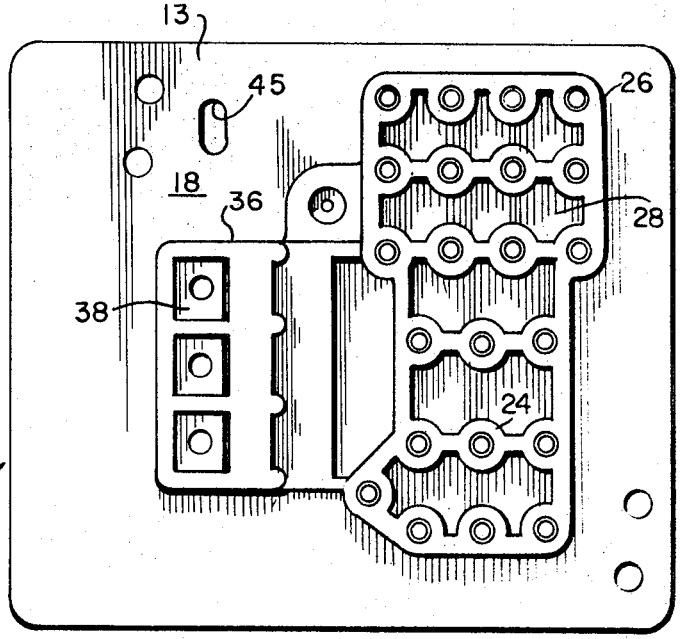
FIG. 3 is a bottom view of the plug.
Figure 4:
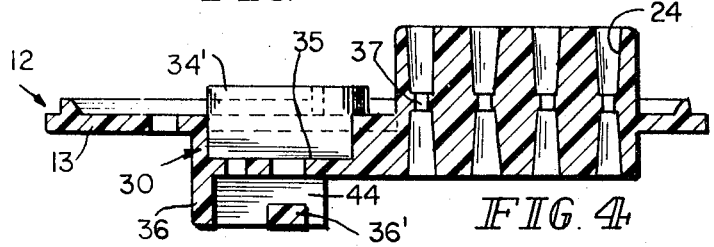
FIG. 4 is a cross section of the plug taken along lines 4—4 of FIG. 2.

Referring to FIGS. 2–4, the plug 12 includes base portion 13 having a top face 16 and a bottom face 18, both of the faces having means to separate the high and low voltage wiring. The plug 12 is unitarily constructed and may be fabricated from an electrically insulative material such as a suitable thermosetting plastic. Formed on a portion of the top surface 16 is an island 20 having a plurality of holes 22 formed therein for retaining male terminals of the electro-mechanical device 10 of FIG. 1. Formed on the opposite face 18 of the base portion 13 is another island 26 extending from the base portion. The island 26 is an extension of island 20. Formed within the island 26 is a plurality of individual hollow cylinders 24 extending up into the island 20 to meet the holes 22. As shown, cylinders 24 are individually formed such that there is an air gap 28 to provide additional electrical insulation between the cylinders. Cylinders 24 receive high and low voltage wiring which will be electrically connected to the male terminals of the electro-mechanical device 10 of FIG. 1. Such connection is accomplished through suitable conducting means including jacks 27 shown in FIG. 5. Jacks 27 include sectioned hollow cylindrical member 31 having barbs 33 lanced from member 31 such that the jacks can be securely held in the reduced section 37 of hollow cylinders 24. The wiring 29 may be suitably inserted into one end of the jack with the male terminals 39 of the device 10 being inserted in the other end.

As shown, there is provided in the top face of base portion 13 a cavity 30 formed adjacent the island 20. Extending from opposite ends of the cavity are a pair of walls 32 and 32', and walls 34 and 34' which extend to the base 35 of the cavity 30 so as to divide the cavity into compartments. Although two intermediate walls 34 and 34' are shown to divide the cavity into two compartments, it should be understood that the cavity may be divided into any number of desired compartments.

Figure 6:
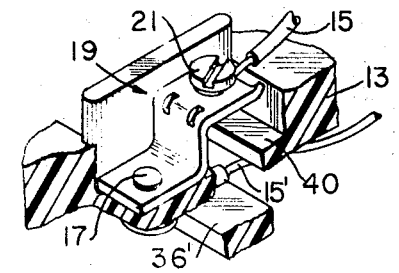
FIG. 6 is a perspective view of a screw terminal showing its relation to certain parts of the plug.

Referring to FIG. 3, there is shown on the opposite or bottom face 18 of the base portion 13 an island 36 having separate cavities 38, the island being formed below the cavity 30. Referring to both FIGS. 2 and 3, there is provided in the base of cavity 30, apertures 40 in each of the compartments such that a portion 36' of the island 36 is exposed. Referring to FIGS. 2 and 6, electrical screw terminals 19 are seated over apertures 40 with the terminal being held by suitable rivets 17 engaging holes 42 formed in the base of the compartments. One group of wiring 15 is connected to the terminal through screw 21, while another group 15' is connected to the terminal through rivet 17. As is more clearly shown in FIG. 4, there are openings 44 formed in the sides of the island 36 such that the group 15' of electrical wiring can be directed from each screw terminal to the cylinders 24.

The group 15 of electrical wiring leading from the screws of the screw terminals are fed to the junction box 14 of FIG. 1 through a suitable aperture 45 formed in the base portion 13. Alternately, the wires from the screw terminals can be directed through channel means 46, the channel being formed from substantially parallel walls 46' and 46".

Figure 5:
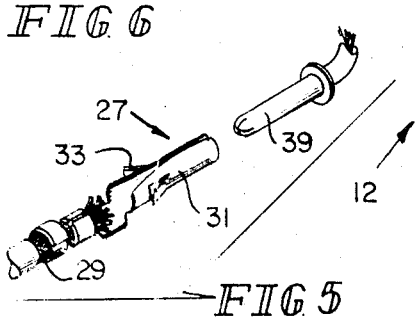
FIG. 5 is a perspective view of a jack used in receiving male terminals of the electro-mechanical device and electrical wiring.

When being used in the manner shown in FIG. 1, a group 15 of low voltage wiring is attached to the screw terminals disposed within the compartments 30' and 30" and 30"' and then the wiring is directed down through aperture 45. Another group 15' of low voltage wiring is connected to the screw terminals through eyelets disposed on the underneath side of rivets 17 and then directed through the openings 44 from the cavity 30 to the cylinders 24 on the underneath side 18 of the base portion, the wiring being first connected to the jacks 27 as shown in FIG. 5. High voltage wiring is fed directly to the hollow cylinders 24 after they too are connected to jacks 27. The high and low voltage wiring is then "made up" or brought together to junction box 14 in the field. The plug 12 is then connected to the junction box through bolts inserted through suitable holes 48. The electro-mechanical device 10 having male terminals is then placed over the top 16 of the base portion with male terminals extending from the device being inserted into holes 22 to engage jacks 27. The device is then securely fastened to the plug through bolts which are inserted through suitable holes such as holes 50. Because of the insulative material of the plug and, in addition the air gap 28 formed between the cylinders, the low and high voltage wiring are electrically insulated from each other. In addition, because of the fact that all the wiring has been completed before being connected to the device, and because there are no wires directly connected to the device, the device can be shipped and handled as a separate unit and then be attached to the junction box.

Thus there is described a plug which is particularly adaptable for insulating high and low voltage wiring which, in addition, allows for the wiring to be "made up" at the factory such that the electro-mechanical device can then be easily electrically connected in the field. These and other features are recited in the appended claims.

I claim:

1. In a plug for receiving electrical wiring, an electrically insulative base portion, means extending through said base portion receiving individual male electrical terminals electrically insulated from each other and electrical wiring so as to electrically connect the wiring to said terminals, a cavity provided in said base portion, substantially parallel walls of electrically insulative material extending from opposed ends of said cavity and at least one wall provided between said opposed ends and extending substantially to the base of said cavity so as to provide at least two compartments receiving groups of wiring, an opening in said compartments directing at least one of said groups to said means receiving individual male electrical terminals, and means directing another of said groups of wiring in a predetermined direction away from said male terminals.

2. In a plug for receiving electrical wiring according to claim 1 wherein said receiving means for electrical wiring and male terminal includes a plurality of spaced electrically insulated hollow cylinders disposed in an island of electrically insulative material extending from opposed faces of said base portion.

3. In a plug for receiving electrical wiring according to claim 2 wherein said receiving means for electrical wiring and male terminals further includes jacks carried in said hollow cylinders.

4. In a plug for receiving electrical wiring according to claim 2 wherein said cylinders are spaced such that each cylinder is substantially surrounded by air gaps so as to provide electrical insulation between the cylinders.

5. In a plug for receiving electrical wiring according to claim 1 wherein said means to direct another of said groups of low voltage wiring in a predetermined direction comprises at least one channel provided on said base portion.

6. In a plug for receiving electrical wiring according to claim 1 wherein said means to direct another of said groups of wiring in a predetermined direction comprises an aperture in said base portion.

7. In a plug for receiving electrical wiring, an electrically insulative base portion, means extending through said base portion receiving individual male electrical terminals electrically insulated from each other and electrical wiring so as to electrically connect the wiring to said terminals, at least one compartment provided in said base portion receiving groups of wiring, an opening in said compartment facing said means receiving male electrical terminals so as to permit at least one of said groups of wiring to be directed toward said male electrical terminals,, an electrical terminal carried in said compartment, an island of electrically insulative material provided on said base portion on the face opposite said compartment, at least two cavities provided in said island, each of said cavities including holes so as to provide communication between said cavities and said electrical terminals, and means to direct another of said groups of wiring in a predetermined direction away from said terminals.

8. In a plug for receiving electrical wiring according to claim 7 wherein said receiving means for electrical wiring and male terminal includes a plurality of spaced electrically insulated hollow cylinders disposed in an island of electrically insulative material extending from opposed faces of said base portion.

9. In a plug for receiving electrical wiring according to claim 8 wherein said receiving means for electrical wiring and male terminals further includes jacks carried in said hollow cylinders.

10. In a plug for receiving electrical wiring according to claim 8 wherein said cylinders are spaced such that each cylinder is substantially surrounded by air gaps so as to provide electrical insulation between the cylinders.

11. In a plug for receiving electrical wiring according to claim 7 wherein said means to direct another of said groups of low voltage wiring in a predetermined direction comprises at least one channel provided on said base portion.

12. In a plug for receiving electrical wiring according to claim 7 wherein said means to direct another of said groups of wiring in a predetermined direction comprises an aperture in said base portion.

13. A plug for receiving wiring which comprises:
(a) a base portion of electrically insulative material having opposite faces,
(b) an island of electrically insulative material extending from each of said faces,
(c) a plurality of hollow cylinders provided in said island, said cylinders being spaced from each other so as to form air gaps therebetween, and jacks carried in said cylinders for receiving male terminals and electrical wiring so as to electrically connect said wiring and said male terminals,
(d) a cavity in said base portion exposed to one of said faces, walls of electrically insulative material extending from opposed ends of said cavity, and at least one wall of electrically insulative material disposed between said end walls to form at least two compartments in said cavity, said walls being substantially parallel, and openings in said compartments facing in the direction of said cylinders,
(e) a second island provided on another of said faces, substantially aligned with said compartments, at least two cavities provided in said second island and apertures in the base of said cavities providing communication between said cavities and said compartments, and
(f) means for directing electrical wiring from said cavities provided in said second island.

References Cited

UNITED STATES PATENTS

| | | | |
|---|---|---|---|
| 3,005,131 | 10/1961 | Melcher et al. | 317—101 |
| 3,274,533 | 9/1966 | Apted et al. | 339—192 |

FOREIGN PATENTS

| | | | |
|---|---|---|---|
| 447,531 | 10/1932 | Australia | 339—193 |
| 973,040 | 11/1959 | Germany | 339—176(M) |
| 228,074 | 1/1925 | Great Britain | 339—191 |

MARVIN A. CHAMPION, Primary Examiner

L. J. STAAB, Assistant Examiner